United States Patent
Bailey

(10) Patent No.: US 7,225,829 B2
(45) Date of Patent: Jun. 5, 2007

(54) FLOW-CONTROL VALVE ASSEMBLY

(75) Inventor: James Christopher Bailey, Yellow Springs, OH (US)

(73) Assignee: Vernay Laboratories, Inc., Yellow Springs, OH (US)

( * ) Notice: Subject to any disclaimer, the term of this patent is extended or adjusted under 35 U.S.C. 154(b) by 305 days.

(21) Appl. No.: 10/971,300

(22) Filed: Oct. 22, 2004

(65) Prior Publication Data

US 2006/0086393 A1 Apr. 27, 2006

(51) Int. Cl.
*G05D 7/01* (2006.01)

(52) U.S. Cl. ............... 137/454.6; 137/517; 137/601.18

(58) Field of Classification Search ....... 137/601.18 X, 137/504, 517 X, 454.6 I; 138/46 X
See application file for complete search history.

(56) References Cited

U.S. PATENT DOCUMENTS

| | | | |
|---|---|---|---|
| 2,223,944 A | 12/1940 | Roy | |
| 2,728,355 A | 12/1955 | Dahl | |
| 2,960,109 A | 11/1960 | Wilson | |
| 3,308,798 A | 3/1967 | Snider | |
| 3,768,507 A | 10/1973 | Dicken, Jr. | |
| 4,609,014 A | 9/1986 | Jurjevic et al. | |
| 4,938,259 A | 7/1990 | Schmidt | |
| 5,027,861 A | 7/1991 | Gute | |
| 5,154,394 A | 10/1992 | DuHack | |
| 5,320,135 A | 6/1994 | Pierrou | |
| 5,899,224 A | 5/1999 | Moldenhauer | |
| 6,378,542 B1 | 4/2002 | DuHack | |

*Primary Examiner*—Stephen M. Hepperle
(74) *Attorney, Agent, or Firm*—Thompson Hine LLP

(57) ABSTRACT

A first expression of a flow-control valve assembly includes a valve body and a resilient flow control positioned in the valve body. The valve body has a valve seat including a radially-inner valve seat portion, a radially-outer valve seat portion and a bypass-flow-channel exit located between the two seat portions. The flow control has a top surface, a bottom surface, and a through passage. The bottom surface is spaced apart from the radially-inner valve seat portion under a lower fluid pressure against the top surface exposing the bypass-flow-channel exit. The bottom surface seats against the radially-inner valve seat portion under a higher fluid pressure blocking the bypass-flow-channel exit. A second expression of a flow-control valve assembly includes a valve body having a bypass-flow-channel exit and includes a resilient flow control which has a substantially-constant-diameter outer cylindrical surface and which has a bottom surface devoid of any protrusion.

20 Claims, 4 Drawing Sheets

FLOW-CONTROL VALVE ASSEMBLY

TECHNICAL FIELD

The present invention relates generally to fluid flow, and more particularly to a flow-control valve assembly.

BACKGROUND OF THE INVENTION

Flow-control valve assemblies are used to provide a substantially constant fluid flow rate over a range of varying line pressures. Applications which employ flow-control valve assemblies include, without limitation, drinking fountains, beverage dispensers, automatic washing machines for clothes or dishes, hydraulic and pneumatic systems, automotive fuel injectors, and pneumatic machine tools.

A known design of a flow-control valve assembly includes a flow control positioned in a valve body, wherein the flow control has a central through passage, and wherein the valve body includes a bypass flow channel. The flow control includes an upstream top surface, a downstream bottom surface, and an outer cylindrical surface. The downstream bottom surface has longitudinally-projecting, resilient feet. The outer cylindrical surface has an annular seal which projects radially outward from the outer cylindrical surface. Fluid flows through the central through passage under a low and a high fluid pressure. When the top surface of the flow control is subjected to a low fluid pressure, the feet provide a stand-off allowing bypass flow. When the top surface of the flow control is subjected to a high fluid pressure, the resilient feet collapse, the flow control engagingly slides downstream a distance in the valve body, and the annular seal seats against a shoulder of the valve body preventing bypass flow.

Still, scientists and engineers continue to seek improved flow controls and improved flow-control valve assemblies.

SUMMARY OF THE INVENTION

A first expression of an embodiment of the invention is for a flow-control valve assembly including a valve body and a resilient flow control. The valve body has a longitudinal axis and has a valve seat. The valve seat includes a completely-annular radially-inner valve seat portion, an at-least-partially-annular radially-outer valve seat portion, and a bypass-flow-channel exit. The bypass-flow-channel exit is located between the radially-inner and radially-outer valve seat portions. The resilient flow control is positioned in the valve body and has an upstream top surface, a downstream bottom surface, and a through passage. The bottom surface seats against the radially-outer valve seat portion under a lower and a higher fluid pressure against the top surface. The through passage is located radially inward of the radially-inner valve seat portion. The bottom surface is spaced apart from the radially-inner valve seat portion under the lower fluid pressure exposing the bypass-flow channel exit. The bottom surface seats against the radially-inner valve seat portion under the higher fluid pressure blocking the bypass-flow channel exit.

A second expression of an embodiment of the invention is for a flow-control valve assembly including a valve body and a resilient flow control. The valve body has a bypass-flow-channel exit. The resilient flow control is positioned in the valve body and includes an upstream top surface, a downstream bottom surface, an outer cylindrical surface connecting the top and bottom surfaces, and a through passage. The outer cylindrical surface has a substantially constant diameter as one travels along the outer cylindrical surface from the top surface to the bottom surface. The bottom surface is devoid of any protrusion. The bottom surface is shaped to block the bypass-flow-channel exit under a higher fluid pressure against the top surface and to expose the bypass-flow-channel exit under a lower fluid pressure against the top surface.

A third expression of an embodiment of the invention is for a flow-control valve assembly including the valve body and the resilient flow control described in the second expression of an embodiment of the invention and including an annular fitting, an "O"-ring seal, and an annular cover. The annular fitting has an annular bottom ledge, and the valve body is positioned in the annular fitting against the bottom ledge. The "O"-ring seal is located between the valve body and the annular fitting. The annular top cover is attached to the annular fitting and covers a radially-outer portion of the top surface of the flow control while exposing the through passage of the flow control.

Several benefits and advantages are derived from one or more of the expressions of an embodiment of the invention. In one example, having a bypass-flow-channel exit between radially-inner and radially-outer valve seat portions allows the bottom surface of the flow control to seat against the radially-outer-valve seat portion under a lower and a higher fluid pressure which essentially eliminates frictional rubbing of the outer cylindrical surface of the flow control against the valve body as the flow control bottom surface deforms under increasing pressure to seat against the radially-inner-valve seat portion to block the bypass-flow-channel exit. In the same or another example, having a flow control with an outer cylindrical surface of substantially constant diameter and with a bottom surface devoid of any protrusions reduces manufacturing complexity.

DESCRIPTION OF THE PREFERRED EMBODIMENTS

Figure 1:
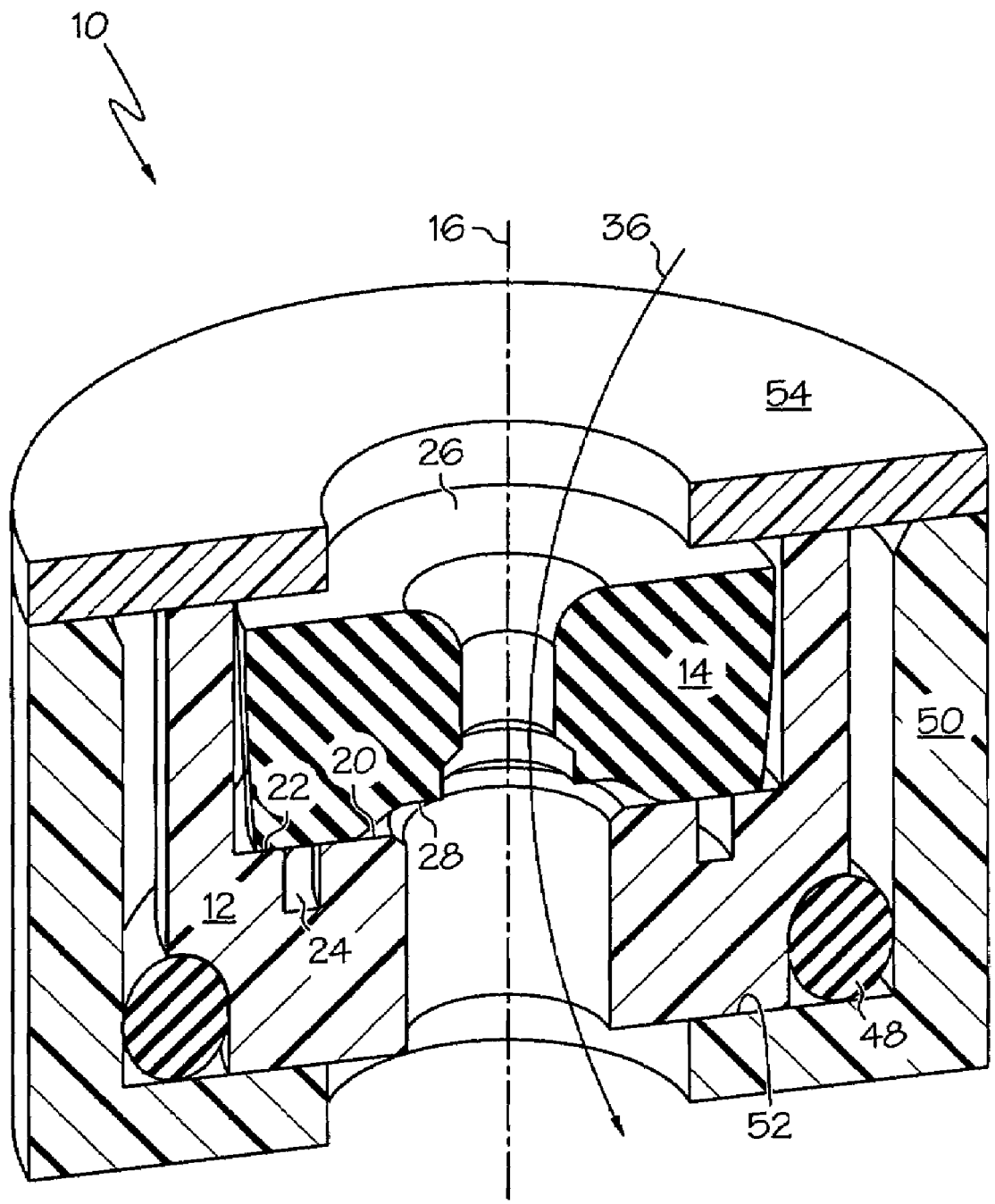
FIG. 1 is a side perspective cutaway of an embodiment of a flow-control valve assembly of the invention including a resilient flow control, a valve body, an annular fitting, an "O"-ring seal, and an annular top cover, wherein higher fluid pressure against the top surface of the flow control has deformed the bottom surface of the flow control to block the bypass-flow-channel exit of the valve seat of the valve body.
Figure 2:
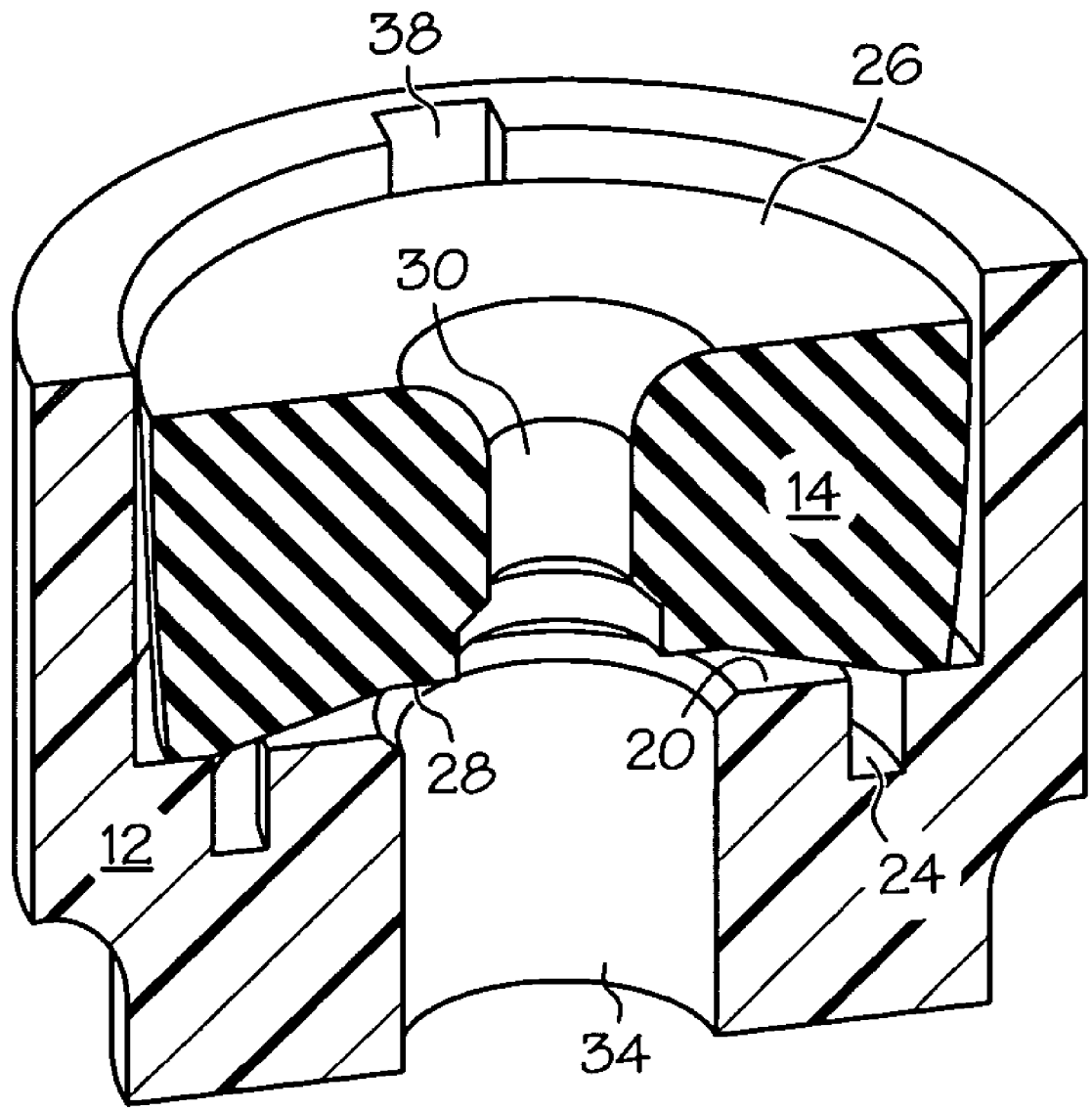
FIG. 2 is a side perspective cutaway view of the flow-control valve assembly of FIG. 1 without the annular fitting, the "O"-ring seal, the annular top cover, and the higher fluid pressure, wherein lower fluid pressure against the top surface of the flow control has allowed the bottom surface of the flow control to resume a substantially unstressed state exposing the bypass-flow-channel exit.
Figure 3:
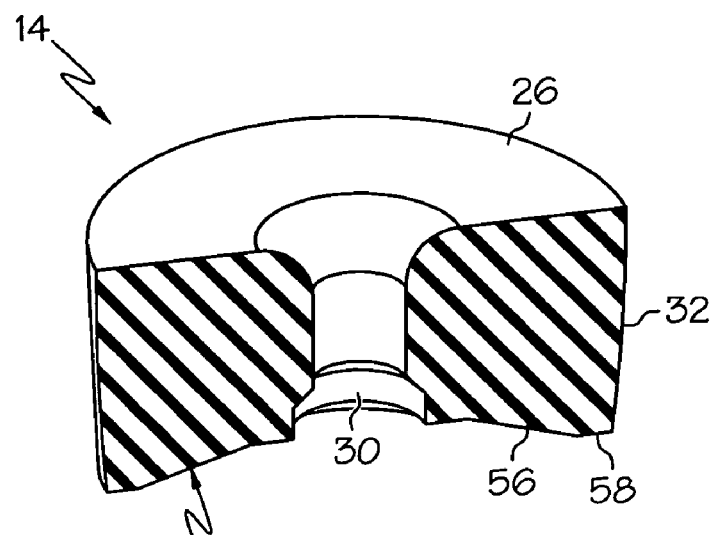
FIG. 3 is a side perspective cutaway view of the flow control of FIG. 2.
Figure 4:
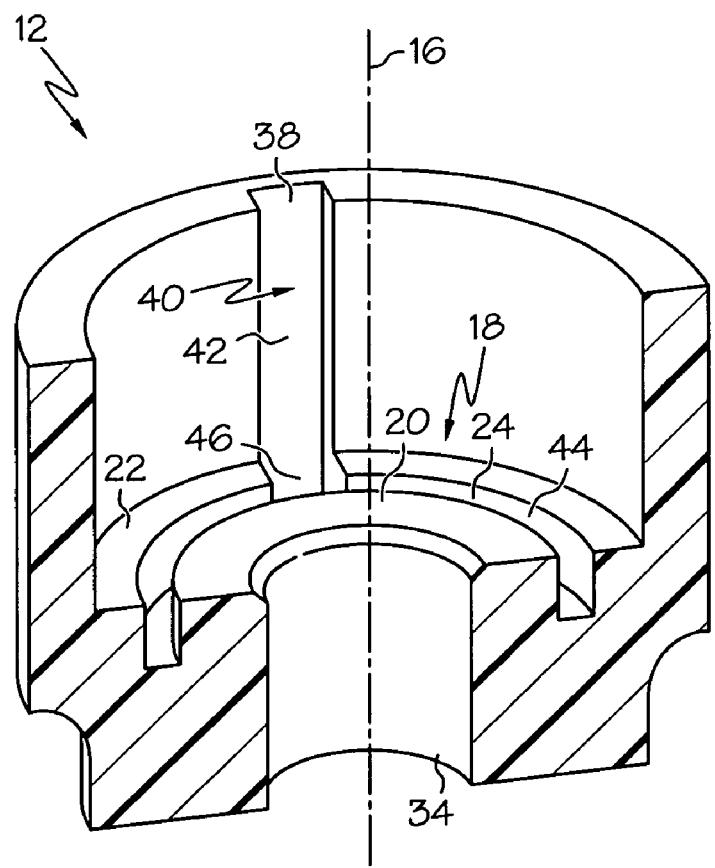
FIG. 4 is a side perspective cutaway view of the valve body of FIGS. 1 and 2.
Figure 5:
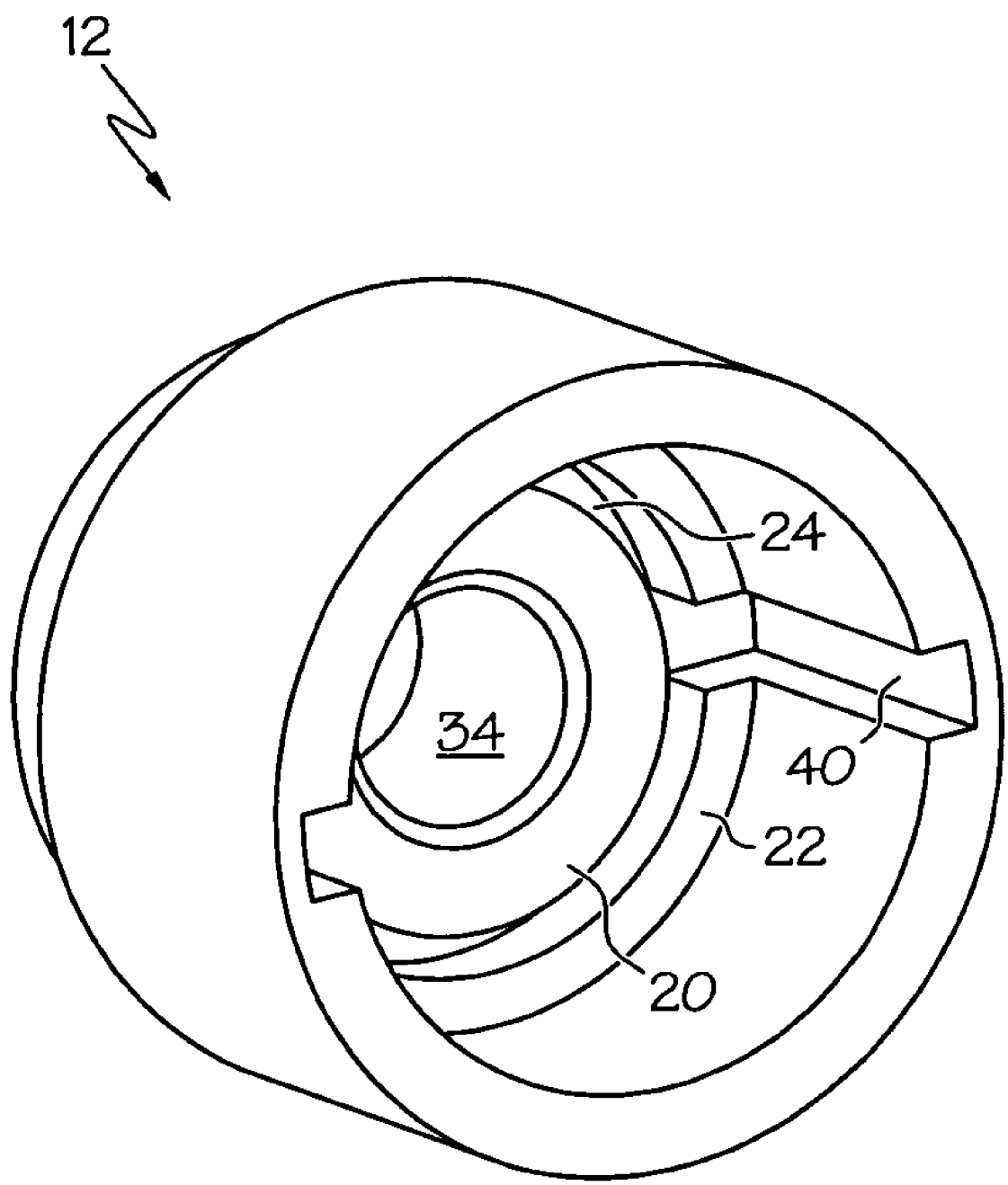
FIG. 5 is a top perspective view of the valve body of FIGS. 1, 2 and 4.

Referring now to the drawings, FIGS. 1–5 illustrate an embodiment of the present invention. A first expression of the embodiment shown in FIGS. 1–5 is for a flow-control valve assembly 10 including a valve body 12 and a resilient flow control 14. The valve body 12 has a longitudinal axis 16 and has a valve seat 18. The valve seat 18 includes a_ completely-annular radially-inner valve seat portion 20, an at-least-partially-annular radially-outer valve seat portion 22, and a bypass-flow-channel exit 24 disposed between the radially-inner and radially-outer valve seat portions 20 and 22. The resilient flow control 14 is disposed in the valve body 12 and has an upstream top surface 26, a downstream bottom surface 28, and a through passage 30. The bottom surface 28 seats against the radially-outer valve seat portion 22 under a lower and a higher fluid pressure against the top surface 26. The through passage 30 is disposed radially inward of the radially-inner valve seat portion 20. The bottom surface 28 is spaced apart from the radially-inner valve seat portion 20 under the lower fluid pressure exposing the bypass-flow channel exit 24. The bottom surface 28 seats against the radially-inner valve seat portion 20 under the higher fluid pressure blocking the bypass-flow-channel exit 24.

In one enablement of the first expression of the embodiment of FIGS. 1–5, the flow control 14 has an outer cylindrical surface 32 connecting the top and bottom surfaces 26 and 28. In one variation, the outer cylindrical surface 32 has a substantially constant diameter as one travels along the outer cylindrical surface 32 from the top surface 26 to the bottom surface 28. In a different variation, not shown, the outer cylindrical surface of the flow control is scalloped defining a portion of a bypass flow channel which leads to the bypass-flow-channel exit in the valve seat of the valve body.

It is noted that the through passage 30 extends from the top surface 26 to the bottom surface 28 of the flow control 14. In one construction of the first expression of the embodiment of FIGS. 1–5, the through passage 30 of the flow control 14 is substantially coaxially aligned with the longitudinal axis 16. In a different construction, not shown, the through passage is offset from the longitudinal axis of the valve body and, in one variation, is one of a plurality of through passages.

In one example of the first expression of the embodiment of FIGS. 1–5, the radially-inner valve seat portion 20 surrounds an inner bore 34 substantially coaxially aligned with the longitudinal axis 16, and, under the lower and the higher fluid pressure, fluid flows through the through passage 30 and into the inner bore 34. It is noted that fluid includes liquid (such as, but not limited to, water) and/or gas. Such fluid flow is indicated by an arrow 36 in FIG. 1. It is noted that bypass fluid flow is permitted to exit the bypass-flow-channel exit 24 (as can be visualized from FIG. 2) where the bottom surface 28 of the flow control 14 is substantially unflexed by a lower fluid pressure against the top surface 26 exposing the bypass-flow-channel exit 24 since the bottom surface 28 is not seated on the radially-inner valve-seat portion 20. It is also noted that bypass fluid flow is prevented from exiting the bypass-flow-channel exit 24 (as can be visualized from FIG. 1) where the bottom surface 28 has blocked the bypass-flow-channel exit 24 since higher pressure against the top surface 26 has flexed the bottom surface 28 to seat against the radially-inner valve-seat portion 20.

In one application of the first expression of the embodiment of FIGS. 1–5, under the lower fluid pressure, fluid bypass flow travels from the bypass-flow-channel exit 24 of the valve seat 18, then radially inward between the bottom surface 28 of the flow control 14 and the radially-inner valve seat portion 20 of the valve seat 18, and then into the inner bore 34. In one variation, the bottom surface 28 of the flow control 14 facing an area which includes the bypass-flow-channel exit 24 and the radially-inner valve seat portion 20 has an annular, substantially concave shape. In another variation, not shown, such bottom surface portion has a substantially conical shape. Other variations are left to the artisan.

In one implementation of the first expression of the embodiment of FIGS. 1–5, the valve body 12 is a monolithic valve body. In one variation, the valve body 12 consists essentially of plastic. In a different implementation, not shown, the valve body includes two or more valve body components which together create a valve body having the previously-described valve seat and, in one example, which together create a bypass flow channel leading to the previously-described bypass-flow-channel exit.

In one employment of the first expression of the embodiment of FIGS. 1–5, the valve body 12 includes a bypass-flow-channel entrance 38 disposed upstream of the top surface 26 of the flow control 14. In one variation, the valve body 12 includes a surface groove 40 defining a bypass-flow-channel and fluidly connecting the bypass-flow-channel entrance 38 and the bypass-flow-channel exit 24. It is noted that the bypass-flow-channel allows fluid to flow past the flow control 14 while bypassing the through passage 30 of the flow control 14. In one modification, the surface groove 40 includes a longitudinally-extending portion 42, an annular portion 44, and a radially-extending portion 46 connecting the longitudinally-extending and annular portions 42 and 44. In this modification, an upstream section of the longitudinally-extending portion 42 defines the bypass-flow-channel entrance 38, and the annular portion 44 defines the bypass-flow-channel exit 24. In this modification, the longitudinally-extending portion 42 is disposed radially outward of the flow control 14, and the radially-extending portion 46 is disposed in the radially-outer valve seat portion 22. Other modifications, including having a portion of the bypass flow channel be defined by a passageway or surface groove in the flow control 14, are left to the artisan.

In one arrangement of the first expression of the embodiment of FIGS. 1–5, the flow-control valve assembly 10 also includes an "O"-ring seal 48 and an annular fitting 50 having an annular bottom ledge 52. In this arrangement, the valve body 12 is disposed in the annular fitting 50 against the bottom ledge 52 without blocking the inner bore 34 of the radially-inner valve seat portion 20 of the valve seat 18 of the valve body 12, and the "O"-ring seal 48 is disposed between the valve body 12 and the annular fitting 50. In one variation, the flow-control valve assembly 10 also includes an annular top cover 54 attached to the annular fitting 50 and covering a radially-outer portion of the top surface 26 of the flow control 14 while exposing the through passage 30 of the flow control 14.

A second expression of the embodiment of FIGS. 1–5 is for a flow-control valve assembly 10 including a valve body 12 having a bypass-flow-channel exit 24 and including a resilient flow control 14 disposed in the valve body 12. The flow control 14 includes an upstream top surface 26, a downstream bottom surface 28, an outer cylindrical surface 32 connecting the top and bottom surfaces 26 and 28, and a through passage 30. The outer cylindrical surface 32 has a substantially constant diameter as one travels along the outer cylindrical surface 32 from the top surface 26 to the bottom surface 28. The bottom surface 28 is devoid of any protrusion. The bottom surface 28 is shaped to block the bypass-flow-channel exit 24 under a higher fluid pressure against the top surface 26 and to expose the bypass-flow-channel exit 24 under a lower fluid pressure against the top surface 26.

In one configuration of the second expression of the embodiment of FIGS. 1–5, the through passage 30 is a central through passage. In one variation, the bottom surface 28 includes an annular concave surface portion 56 which extends further downstream as one travels along the annular concave surface portion 56 from the through passage 30 radially outward toward the outer cylindrical surface 32. In one modification, the bottom surface 28 includes an annular planar surface portion 58 connecting the annular concave surface portion 58 to the outer cylindrical surface 32.

A third expression of the embodiment of FIGS. 1–5 is for a flow-control valve assembly 10 including a valve body 12 having a bypass-flow-channel exit 24, including a resilient flow control 14 disposed in the valve body 12, including an annular fitting 50, including an "O"-ring seal 48, and including an annular top cover 54. The flow control 14 includes an upstream top surface 26, a downstream bottom surface 28, an outer cylindrical surface 32 connecting the top and bottom surfaces 26 and 28, and a through passage 30. The outer cylindrical surface 32 has a substantially constant diameter as one travels along the outer cylindrical surface 32 from the top surface 26 to the bottom surface 28. The bottom surface 28 is devoid of any protrusion. The bottom surface 28 is shaped to block the bypass-flow-channel exit 24 under a higher fluid pressure against the top surface 26 and to expose the bypass-flow-channel exit 24 under a lower fluid pressure against the top surface 26. The annular fitting 50 has an annular bottom ledge 52, and the valve body 12 is positioned in the annular fitting 50 against the bottom ledge 52. The "O"-ring seal 48 is located between the valve body 12 and the annular fitting 50. The annular top cover 54 is attached to the annular fitting 50 and covers a radially-outer portion of the top surface 26 of the flow control 14 while exposing the through passage 30 of the flow control 14.

In one configuration of the third expression of the embodiment of FIGS. 1–5, the through passage 30 is a central through passage. In one variation, the bottom surface 28 includes an annular concave surface portion 56 which extends further downstream as one travels along the annular concave surface portion 56 from the through passage 30 radially outward toward the outer cylindrical surface 32. In one modification, the bottom surface 28 includes an annular planar surface portion 58 connecting the annular concave surface portion 58 to the outer cylindrical surface 32.

Several benefits and advantages are derived from one or more of the expressions of an embodiment of the invention. In one example, having a bypass-flow-channel exit between radially-inner and radially-outer valve seat portions allows the bottom surface of the flow control to seat against the radially-outer-valve seat portion under a lower and a higher fluid pressure which essentially eliminates frictional rubbing of the outer cylindrical surface of the flow control against the valve body as the flow control bottom surface deforms under increasing pressure to seat against the radially-inner-valve seat portion to block the bypass-flow-channel exit. In the same or another example, having a flow control with an outer cylindrical surface of substantially constant diameter and with a bottom surface devoid of any protrusions reduces manufacturing complexity.

The foregoing description of several expressions of an embodiment of the invention has been presented for purposes of illustration. It is not intended to be exhaustive or to limit the invention to the precise forms disclosed, and obviously many modifications and variations are possible in light of the above teaching. It is intended that the scope of the invention be defined by the claims appended hereto.

The invention claimed is:

1. A flow-control valve assembly comprising:
   a) a valve body having a longitudinal axis and having a valve seat including a completely-annular radially-inner valve seat portion, including an at-least-partially-annular radially-outer valve seat portion, and including a bypass-flow-channel exit disposed between the radially-inner and radially-outer valve seat portions; and
   b) a resilient flow control disposed in the valve body and having an upstream top surface, a downstream bottom surface, and a through passage, wherein the bottom surface seats against the radially-outer valve seat portion under a lower and a higher fluid pressure against the top surface, wherein the through passage is disposed radially inward of the radially-inner valve seat portion, wherein the bottom surface is spaced apart from the radially-inner valve seat portion under the lower fluid pressure exposing the bypass-flow channel exit, and wherein the bottom surface seats against the radially-inner valve seat portion under the higher fluid pressure blocking the bypass-flow-channel exit.

2. The flow-control valve assembly of claim 1, wherein the flow control has an outer cylindrical surface connecting the top and bottom surfaces, and wherein the outer cylindrical surface has a substantially constant diameter as one travels along the outer cylindrical surface from the top surface to the bottom surface.

3. The flow-control valve assembly of claim 1, wherein the through passage of the flow control is substantially coaxially aligned with the longitudinal axis.

4. The flow-control valve assembly of claim 3, wherein the radially-inner valve seat portion surrounds an inner bore substantially coaxially aligned with the longitudinal axis, and wherein, under the lower and the higher fluid pressure, fluid flows through the through passage and into the inner bore.

5. The flow-control valve assembly of claim 4, wherein under the lower fluid pressure, fluid bypass flow travels from the bypass-flow-channel exit of the valve seat, then radially inward between the bottom surface of the flow control and the radially-inner valve seat portion of the valve seat, and then into the inner bore.

6. The flow-control valve assembly of claim 5, wherein the bottom surface of the flow control facing an area which includes the bypass-flow-channel exit and the radially-inner valve seat portion has an annular, substantially concave shape.

7. The flow-control valve assembly of claim 6, wherein the valve body is a monolithic valve body.

8. The flow-control valve assembly of claim 7, wherein the valve body includes a bypass-flow-channel entrance disposed upstream of the top surface of the flow control.

9. The flow-control valve assembly of claim 8, wherein the valve body includes a surface groove defining a bypass-flow-channel and fluidly connecting the bypass-flow-channel entrance and the bypass-flow-channel exit.

10. The flow-control valve assembly of claim 9, wherein the surface groove includes a longitudinally-extending portion, an annular portion, and a radially-extending portion connecting the longitudinally-extending and annular portions, wherein an upstream section of the longitudinally-extending portion defines the bypass-flow-channel entrance, wherein the annular portion defines the bypass-flow-channel exit, wherein the longitudinally-extending portion is disposed radially outward of the flow control, and wherein the radially-extending portion is disposed in the radially-outer valve seat portion.

11. The flow-control valve assembly of claim 10, also including an "O"-ring seal and including an annular fitting having an annular bottom ledge, wherein the valve body is disposed in the annular fitting against the bottom ledge without blocking the inner bore of the radially-inner valve seat portion of the valve seat of the valve body, and wherein the "O"-ring seal is disposed between the valve body and the annular fitting.

12. The flow-control valve assembly of claim 11, also including an annular top cover attached to the annular fitting and covering a radially-outer portion of the top surface of the flow control while exposing the through passage of the flow control.

13. A flow-control valve assembly comprising:
   a) a valve body having a bypass-flow-channel entrance and a bypass-flow-channel exit in fluid communication with the bypass-flow-channel entrance; and
   b) a resilient flow control disposed in the valve body and including an upstream top surface, a downstream bottom surface, an outer cylindrical surface connecting the top and bottom surfaces, and a through passage, wherein the outer cylindrical surface has a substantially constant diameter as one travels along the outer cylindrical surface from the top surface to the bottom surface, wherein the bottom surface is devoid of any protrusion, wherein the bottom surface is shaped to block the bypass-flow-channel exit under a higher fluid pressure against the top surface and to expose the bypass-flow-channel exit under a lower fluid pressure against the top surface, and wherein fluid flow which enters the bypass-flow-channel entrance will exit the exposed bypass-flow-channel exit having flowed around an outer periphery of the flow control.

14. The flow-control valve assembly of claim 13, wherein the through passage is a central through passage.

15. The flow-control valve assembly of claim 14, wherein the bottom surface includes an annular concave surface portion which extends further downstream as one travels along the annular concave surface portion from the through passage radially outward toward the outer cylindrical surface.

16. The flow-control valve assembly of claim 15, wherein the bottom surface includes an annular planar surface portion connecting the annular concave surface portion to the outer cylindrical surface.

17. A flow-control valve assembly comprising:
   a) a valve body having a bypass-flow-channel entrance and a bypass-flow-channel exit in fluid communication with the bypass-flow-channel entrance;
   b) a resilient flow control disposed in the valve body and including an upstream top surface, a downstream bottom surface, an outer cylindrical surface connecting the top and bottom surfaces, and a through passage, wherein the outer cylindrical surface has a substantially constant diameter as one travels along the outer cylindrical surface from the top surface to the bottom surface, wherein the bypass-flow-channel entrance is disposed upstream of the top surface of the flow control, wherein the bottom surface is devoid of any protrusion, and wherein the bottom surface is shaped to block the bypass-flow-channel exit under a higher fluid pressure against the top surface and to expose the bypass-flow-channel exit under a lower fluid pressure against the top surface;
   c) an annular fitting having an annular bottom ledge, wherein the valve body is disposed in the annular fitting against the bottom ledge;
   d) an "O"-ring seal disposed between the valve body and the annular fitting; and
   e) an annular top cover attached to the annular fitting and covering a radially-outer portion of the top surface of the flow control while exposing the through passage of the flow control.

18. The flow-control valve assembly of claim 17, wherein the through passage is a central through passage.

19. The flow-control valve assembly of claim 18, wherein the bottom surface includes an annular concave surface portion which extends further downstream as one travels along the annular concave surface portion from the through passage radially outward toward the outer cylindrical surface.

20. The flow-control valve assembly of claim 19, wherein the bottom surface includes an annular planar surface portion connecting the annular concave surface portion to the outer cylindrical surface.

* * * * *